United States Patent [19]

Bond et al.

[11] Patent Number: 5,537,660
[45] Date of Patent: Jul. 16, 1996

[54] MICROCONTROLLER HAVING SELECTABLE BUS TIMING MODES BASED ON PRIMARY AND SECONDARY CLOCKS FOR CONTROLLING THE EXCHANGE OF DATA WITH MEMORY

[75] Inventors: Joseph R. Bond, San Jose, Calif.; Herve R. Lambert, Gilbert, Ariz.

[73] Assignee: Intel Corporation, Santa Clara, Calif.

[21] Appl. No.: 341,453

[22] Filed: Nov. 17, 1994

Related U.S. Application Data

[63] Continuation of Ser. No. 870,399, Apr. 17, 1992, abandoned.

[51] Int. Cl.[6] ................................................. G06F 1/06
[52] U.S. Cl. .................... 395/878; 395/834; 395/550; 364/940.1; 364/964; 364/DIG. 2
[58] Field of Search ............................... 395/800, 275, 395/550, 325; 375/356

[56] References Cited

U.S. PATENT DOCUMENTS

| | | | |
|---|---|---|---|
| 4,425,643 | 1/1984 | Chapman et al. | 371/20 |
| 4,727,491 | 2/1988 | Culley | 364/200 |
| 4,771,279 | 9/1988 | Hannah | 340/801 |
| 5,047,922 | 9/1991 | Borkar | 364/200 |
| 5,136,180 | 8/1992 | Caviasca et al. | 307/269 |
| 5,151,986 | 9/1992 | Langan et al. | 395/550 |
| 5,208,838 | 5/1993 | Wendell et al. | 375/106 |
| 5,218,704 | 6/1993 | Watts, Jr. et al. | 395/750 |
| 5,254,888 | 10/1993 | Lee et al. | 307/480 |
| 5,263,172 | 11/1993 | Olnowich | 395/800 |
| 5,282,210 | 1/1994 | Slegel et al. | 370/112 |
| 5,301,278 | 4/1994 | Bowater et al. | 395/275 |
| 5,325,516 | 6/1994 | Blomgren et al. | 395/550 |
| 5,379,386 | 1/1995 | Swarts et al. | 395/325 |
| 5,398,262 | 3/1995 | Ahuja | 375/356 |

*Primary Examiner*—Thomas C. Lee
*Assistant Examiner*—Le Hien Luu
*Attorney, Agent, or Firm*—Blakely, Sokoloff, Taylor & Zafman

[57] ABSTRACT

An integrated circuit microcontroller with improved system bus timing modes that allow higher speed operation when accessing external memory. The improved system bus timing modes are generated by using the edges of a higher frequency secondary clock to trigger system bus timing events instead of using the edges of the phase clock. This can be done without major redesign using combinational logic because the phase clock and the higher frequency secondary clock are substantially in-phase.

32 Claims, 6 Drawing Sheets

FIG. 3 Mode 0 Timings (Prior Art)

TOE max = 1.0 TOSC - 30 ns
TDF max = 1.0 TOSC
TACC max = 3.0 TOSC - 30 ns
TWP max = 1.0 TOSC
TAW max = 3.0 TOSC

FIG. 4

FIG. 5 Mode 1 System Bus Timings

FIG. 6 Mode 2 System Bus Timings

TOE max = 2.0 TOSC - 33 ns
TDF max = 0.5 TOSC
TACC max = 3.5 TOSC - 33 ns
TWP max = 2.0 TOSC
TAW max = 3.5 TOSC

MICROCONTROLLER HAVING SELECTABLE BUS TIMING MODES BASED ON PRIMARY AND SECONDARY CLOCKS FOR CONTROLLING THE EXCHANGE OF DATA WITH MEMORY

This is a continuation of application Ser. No. 07/870,399, filed Apr. 17, 1992, now abandoned.

BACKGROUND OF THE INVENTION

1. Field of the Invention.

The invention relates generally to the field of MOS integrated circuit microcontrollers and more specifically to the system bus of such microcontrollers used for transferring data between the microcontroller and an external memory.

2. Description of the Prior Art

Semiconductor microcontroller chips generally incorporate a certain amount of program and/or data memory on-chip. For various reasons such as prototyping, large memory requirements, program updates, etc., microcontrollers also need to access external memory devices. Such access is usually done over a multiplexed address/data system bus under the control of a few dedicated control signals carrying information such as when the address is valid, whether the access is a read or a write access, and whether a read access is for code or data.

A microcontroller family has a long commercial life. Over time the implementation choices made at the time of the initial design for the system bus timings may not permit the system bus to interconnect efficiently with memory devices as the technology evolves. For example, a microcontroller may initially be designed to operate with a 10 MHz system clock with system bus timings that allow compatibility with a variety of commercially available memories. Compatibility of a memory with the microcontroller is determined by a given memory's ability to meet the microcontroller's system bus timing specifications. Over time the manufacturing technology advances allowing the same microcontroller design manufactured using modern manufacturing technology to operate with a 20 MHz system clock. However, at the 20 MHz operating frequency the system bus timing specifications are greatly reduced. Even today's fastest, most expensive EPROM memories are not capable of reliably exchanging data with the microcontroller using the originally defined system bus timings. This is a serious limitation on the marketability of an older microcontroller design as it matures with advancing technology.

After choosing a microcontroller design, commercial users of microcontrollers invest a significant amount of time and money in developing hardware and software that are compatible with the chosen microcontroller. Because of the large investment involved in choosing a new microcontroller design, commercial users prefer to continue using a previously selected microcontroller design unless newer microcontroller designs provide a significant advantage such as a substantial increase in performance or a substantial decrease in overall system cost. Newer microcontrollers are designed with system bus timings that allow them to operate at their highest operating frequency when transferring data to and from external memory. Therefore, mature microcontrollers having system bus timings that prevent full frequency operation must compete in the marketplace against newer microcontrollers having system bus timings that provide the increased performance of full frequency external operation. To allow mature microcontrollers to compete in system bus access performance with newer microcontrollers, there is a long felt need for providing a means for upgrading the system bus timings of a mature microcontroller. Providing upgraded system bus timings allows a mature microcontroller to operate at the highest frequency allowed by current manufacturing technologies, thereby making the system bus access performance of mature microcontrollers competitive with that of newer microcontrollers. It is important that such an upgrade not require users to make additional hardware and software investments. It is also important that the implementation of the upgraded system bus timings not require a complete redesign or excessive amounts of additional logic.

It is appreciated then that what is needed is a means for improving the system bus timings of a mature microcontroller such that it can operate at frequencies higher than those defined in the original design while accessing external memory. It is also appreciated that providing a variety of upgraded system bus timing modes will provide greater flexibility in choosing which external memory devices to use with the upgraded microcontroller.

SUMMARY OF THE INVENTION

The present invention provides an integrated circuit microcontroller with improved system bus timing modes that allow the microcontroller to operate at higher execution speeds when accessing external memory.

The microcontroller includes an apparatus for exchanging data with a memory via a system bus. The apparatus includes a selector, a clock generator, and a bus controller. The selector selects either a first or second timing mode. The clock generator generates a primary clock and a secondary clock. The secondary clock is an integer frequency multiple of the primary clock. The bus controller generates a plurality of control signals for controlling the exchange of data with the memory on the system bus. The bus controller generates the control signals in response to the primary clock in the first timing mode and in response to the secondary clock in the second timing mode. The control signals have a first predetermined timing relationship when the first timing mode is selected and a second predetermined timing relationship when the second timing mode is selected. The timing relationship of the control signals determine certain system bus timings. Thus, the apparatus provides a microcontroller with multiple system bus timing modes.

DETAILED DESCRIPTION OF THE PREFERRED EMBODIMENT

An integrated circuit microcontroller chip with improved system bus timing modes that allow higher frequency operation when the microcontroller accesses external memory is described. In the following description, numerous specific details are set forth, such as clock frequencies, timing specifications, and timing relationships, etc., in order to provide a thorough understanding of the present invention. It will be obvious, however, to one skilled in the art that the present invention may be practiced without these specific details. In other instances, well-known circuits have not been described in detail in order not to obscure the present invention.

Figure 1:
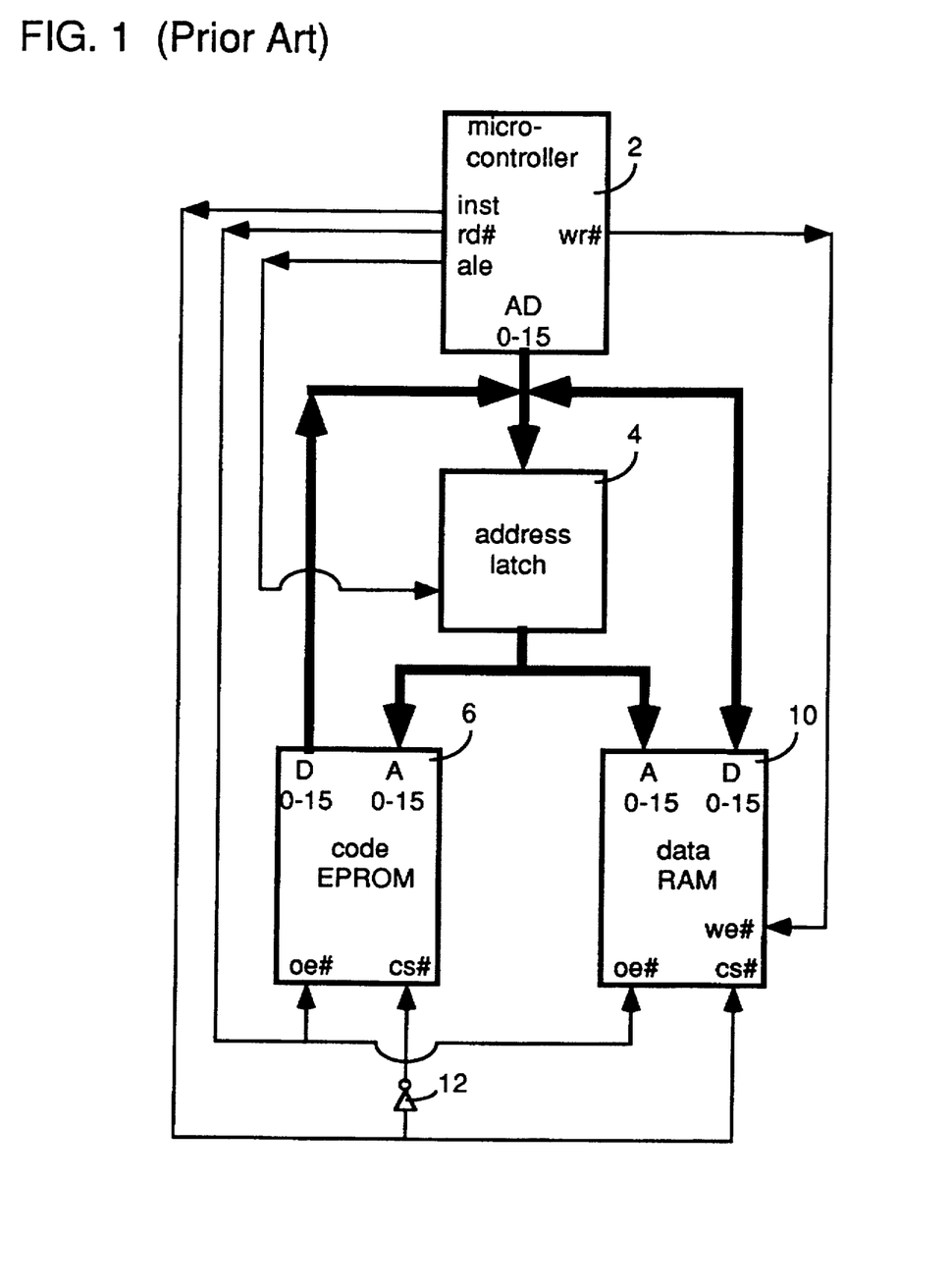
FIG. 1 is a block diagram of a typical prior art configuration for allowing a microcontroller to exchange data with external memory devices.

FIG. 1 illustrates in block diagram form a typical configuration for allowing microcontroller 2 to exchange data with a code EPROM (Erasable Programmable Read-Only Memory) 6 and a data RAM (Random Access Memory) 10. Microcontroller 2 has a 16-bit multiplexed address/data system bus at pins AD0-15 which are coupled to address latch 4 and data pins D0-15 of code EPROM 6 and data RAM 10. Microcontroller 2 provides an ale (address latch enable) signal to address latch 4 for indicating when a valid address on AD0-15 should be latched by address latch 4. Address latch 4 provides the latched address to address pins A0-15 of code EPROM 6 and data RAM 10. Microcontroller 2 further provides a rd# (complement of read signal, i.e. the signal is active low) for indicating when an external memory is to drive data onto the system bus during a write access. Microcontroller 2 also provides a wr# (complement of write) signal for indicating when valid data on AD0-15 should be written to an external memory during a write access. Rd# of microcontroller 2 is coupled to oe# (complement of output enable) of code EPROM 6 and data RAM 10 to enable the selected memory to drive data on the system bus when rd# is low. Wr# of microcontroller 2 is coupled to we# (complement of write enable) of data RAM 10 for causing data on the system bus to be written to data RAM 10. In addition, microcontroller 2 provides an inst (instruction) signal which is coupled through inverter 12 to cs# (complement of chip select) of code EPROM 6 and directly to cs# of data RAM 10 for selecting code EPROM 6 to drive data onto the system bus if a read access is for a program instruction (code) or data RAM 10 to drive data onto the system bus if a read access is for data.

Figure 2:
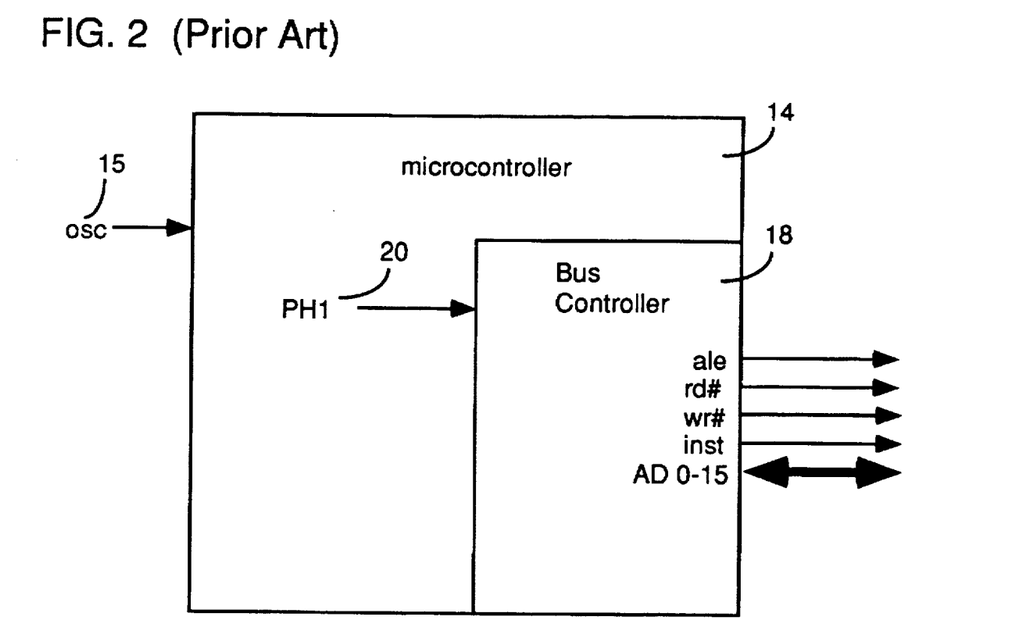
FIG. 2 is a block diagram of a typical prior art microcontroller illustrating the bus controller block that generates the system bus and associated control signals of the microcontroller.

FIG. 2 illustrates a block diagram of a typical prior art microcontroller 14 including a bus controller 18. Osc 15 is the system clock input to microcontroller 14. Osc 15 is frequency divided-by-two to create ph1 20. The rising and falling edges of ph1 20 are used by bus controller 18 to trigger events on the system bus. Bus controller 18 includes a system bus AD0-15, and system bus control signals ale, rd#, wr#, and inst.

Figure 3:
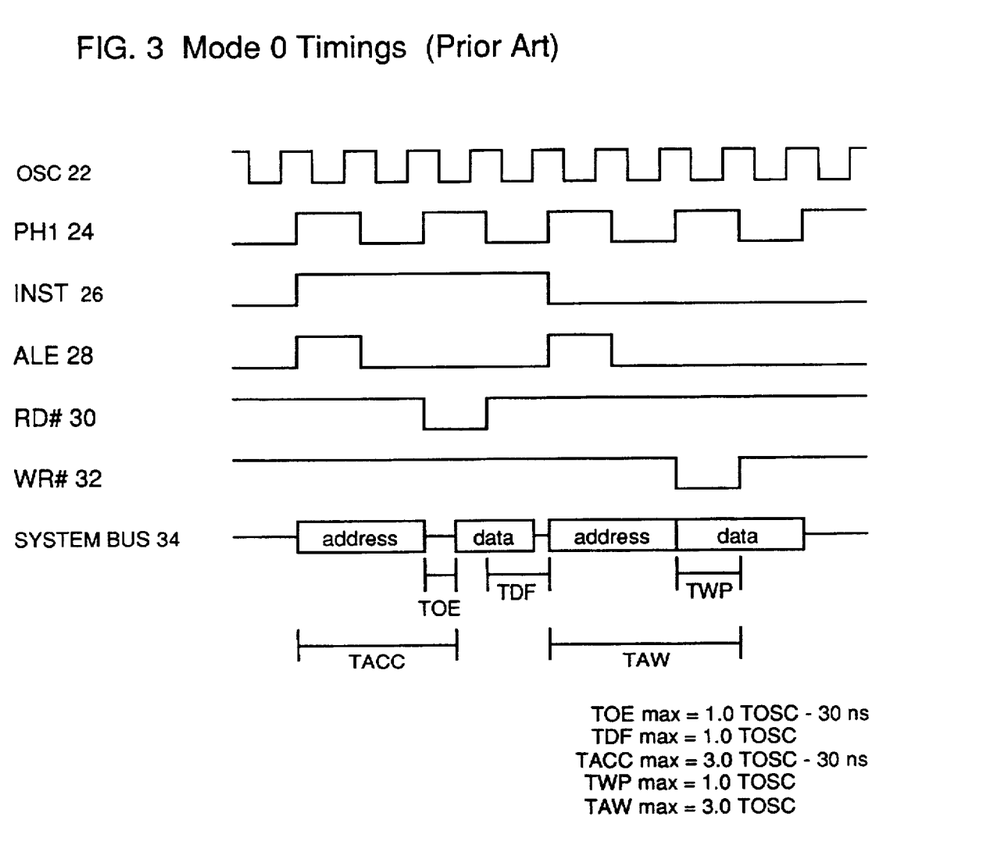
FIG. 3 is a timing diagram of waveforms that define the mode0 system bus timings for a typical prior art microcontroller.

FIG. 3 illustrates the system bus timings for a typical prior art microcontroller. Osc 22 is the input system clock to the microcontroller chip. Osc 22 is frequency divided-by-two to generate ph1 24. The edges of ph1 24 are used to trigger events of the system bus 34 and system bus control signals inst 26, ale 28, rd# 30, and wr# 32 in mode0 timings. Inst 26 when asserted high indicates that a read access is for code. Ale 28 when asserted high indicates that a valid address is on system bus 34. Rd# 30 when asserted low indicates a read access from external memory. Wr# 32 when asserted low indicates a write access to external memory. All system bus events are triggered by edges of ph1 24 in the mode0 timing mode of the prior art.

With respect to read accesses, three important system bus timing specifications that an external memory must meet in order to guarantee reliable accesses are defined. First, TOE is the time allowed for the external memory to drive valid data on the system bus after the microcontroller causes rd# 30 to go low. A typical maximum value of TOE in mode0 timings is (1.0 TOSC–30 ns) where TOSC is the period of the system clock, osc 22. In this case, the external memory must drive valid data 30 ns before rd# 30 goes high to insure that the microcontroller will accurately latch the data. Second, TACC is the time allowed for the external memory to drive valid data on the system bus after the microcontroller drives a valid address on the system bus. A typical maximum value of TACC in mode0 timings is (3.0 TOSC–30 ns) In this case, the external memory must drive valid data 30 ns before rd# 30 goes high to insure that the microcontroller will accurately latch the data. Third, TDF is time allowed for the external memory to stop driving the system bus after rd# 30 goes high to prevent contention with the microcontroller driving the next address on the system bus. A typical maximum value of TACC in mode0 timings is 1.0 TOSC. An external memory must perform within the TOE, TACC, and TDF system bus specifications of the microcontroller to guarantee reliable read accesses to the external memory by the microcontroller.

With respect to write accesses, two important system bus timing specifications that an external memory must meet in order to guarantee reliable accesses are defined. First, TWP is the wr# 32 pulse width. The external memory must recognize that valid data is on the bus and latch it within the time specified by TWP. A typical maximum value of TWP in mode0 timings is 1.0 TOSC. Second, TAW is the time from a valid address on the system bus to the end of the wr# 32 pulse. The microcontroller must provide valid write data on the system bus before TAW expires. The external memory must decode the address and be prepared to write the data on the system bus to a specific location in memory within the time specified by TAW. The data on the system bus is latched into the specific location in the external memory as TAW elapses at the rising edge of the wr# 32 pulse. A typical maximum value for TAW in mode0 timings is 3.0 TOSC. An external memory must perform within the TWP and TAW system bus specifications of the microcontroller to guarantee reliable write accesses by the microcontroller to the external memory.

A microcontroller family has a long commercial life. Over time the implementation choices made at the time of the initial design for the system bus timings may not permit the system bus to interconnect efficiently with memory devices as the technology evolves. For example, a microcontroller may initially be designed to operate with a 10 MHz system clock with the mode0 system bus timings defined in FIG. 3. In mode0, a 10 MHz system clock would give maximum specifications for TOE, TACC, TDF, TWP, and TAW of 70 ns, 270 ns, 100 ns, 100 ns, and 300 ns, respectively. A variety of commercially available memories meet these specifications. Over time the manufacturing technology advances allowing the same microcontroller design manufactured using modern manufacturing technology to operate with a 20 MHz system clock. With the increased system clock frequency the mode0 system bus timing specifications of TOE, TACC, TDF, TWP, and TAW are reduced to 20 ns, 120 ns, 50 ns, 50 ns, and 150 ns, respectively. Even today's fastest, most expensive EPROM memories are not capable of meeting these timing specifications making it impossible for the microcontroller to reliably access external memory when operating at frequencies much higher than the 10 MHz for which the system bus timings of the microcontroller were originally designed. This is a serious limitation on the marketability of an older microcontroller design.

Figure 4:
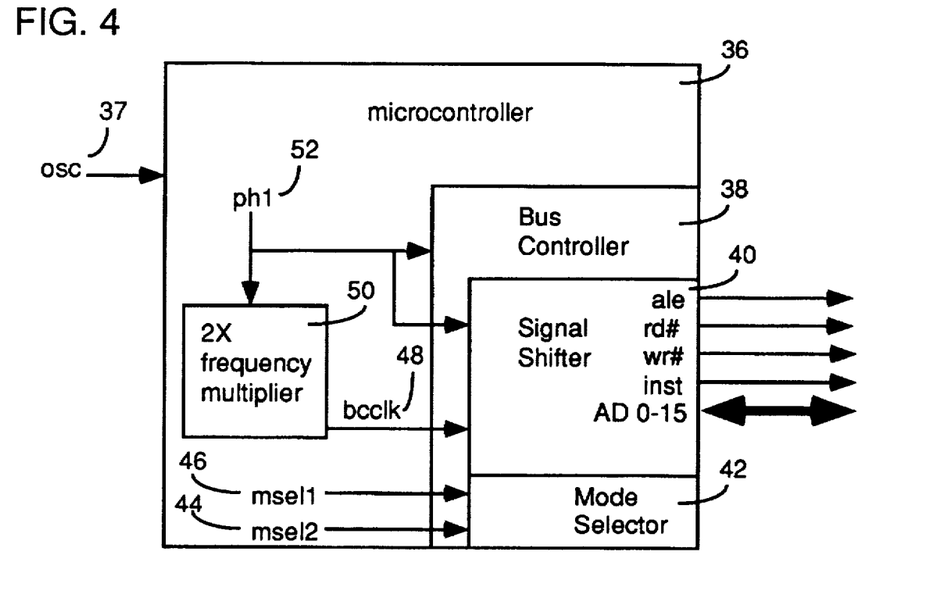
FIG. 4 is a block diagram of the microcontroller of the currently preferred embodiment of the present invention.

FIG. 4 illustrates in block diagram form the microcontroller of the currently preferred embodiment of the present invention. The microcontroller of the present invention is readily realized as an integrated circuit using well known complementary metal-oxide semiconductor (CMOS) processing technology. Microcontroller 36 receives system clock osc 37 and generates the on-chip clock ph1 52. Osc 37 and ph1 52 are not in-phase. A 2× frequency multiplier 50 receives ph1 52 and generates bcclk 48 which is a squarewave signal that is twice the frequency of and substantially in-phase with ph1 52. Ph1 52 and bcclk 48 being substantially in-phase means that for each edge of ph1 52 an edge of bcclk 48 occurs at substantially the same time. The 2× frequency multiplier 50 can be implemented with a phase-locked loop frequency multiplier circuit as described in U.S. Pat. No. 5,281,863 "A PHASE-LOCKED LOOP FREQUENCY-MULTIPLYING PHASE-MATCHING CIRCUIT WITH A SQUARE-WAVE OUTPUT." This U.S. Patent is assigned to the assignee of the present invention. Because ph1 52 and bcclk 48 are substantially in-phase they can be logically combined, without major modification to the original design, to trigger system bus timing events on edges of bcclk 48, thereby providing greater flexibility in the placement of the system bus timing events.

Figure 5:
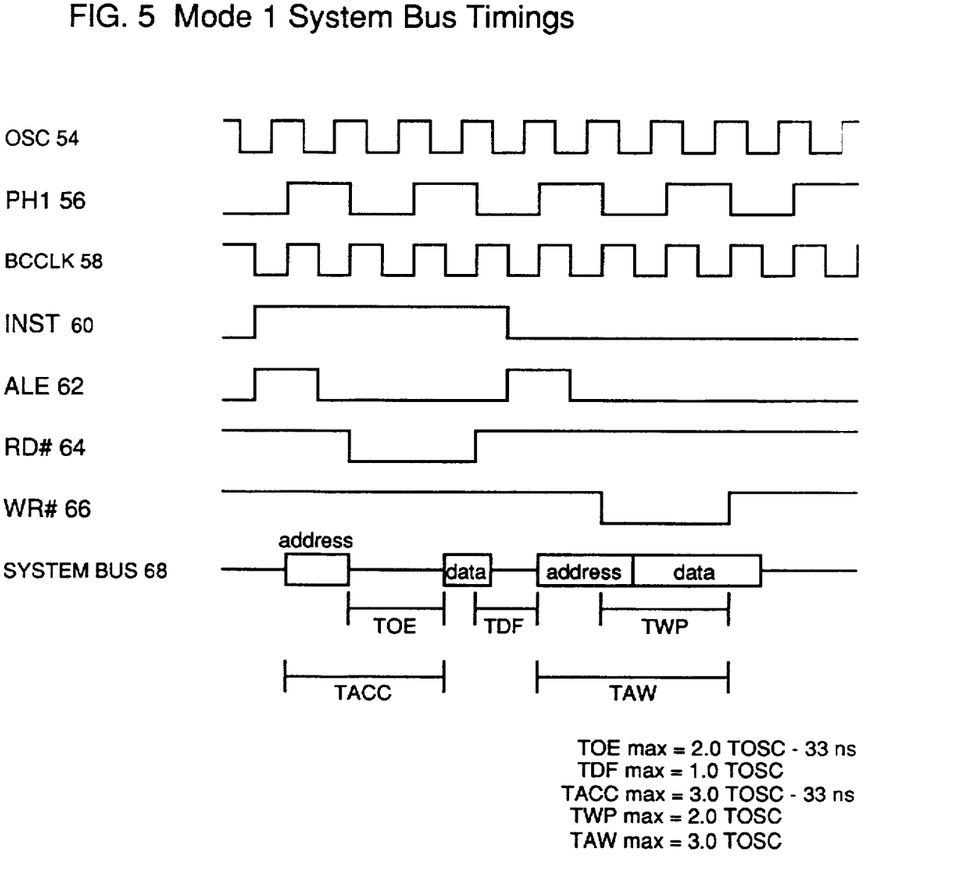
FIG. 5 is a timing diagram of waveforms that define the mode1 improved system bus timings of the currently preferred embodiment of the present invention.
Figure 6:
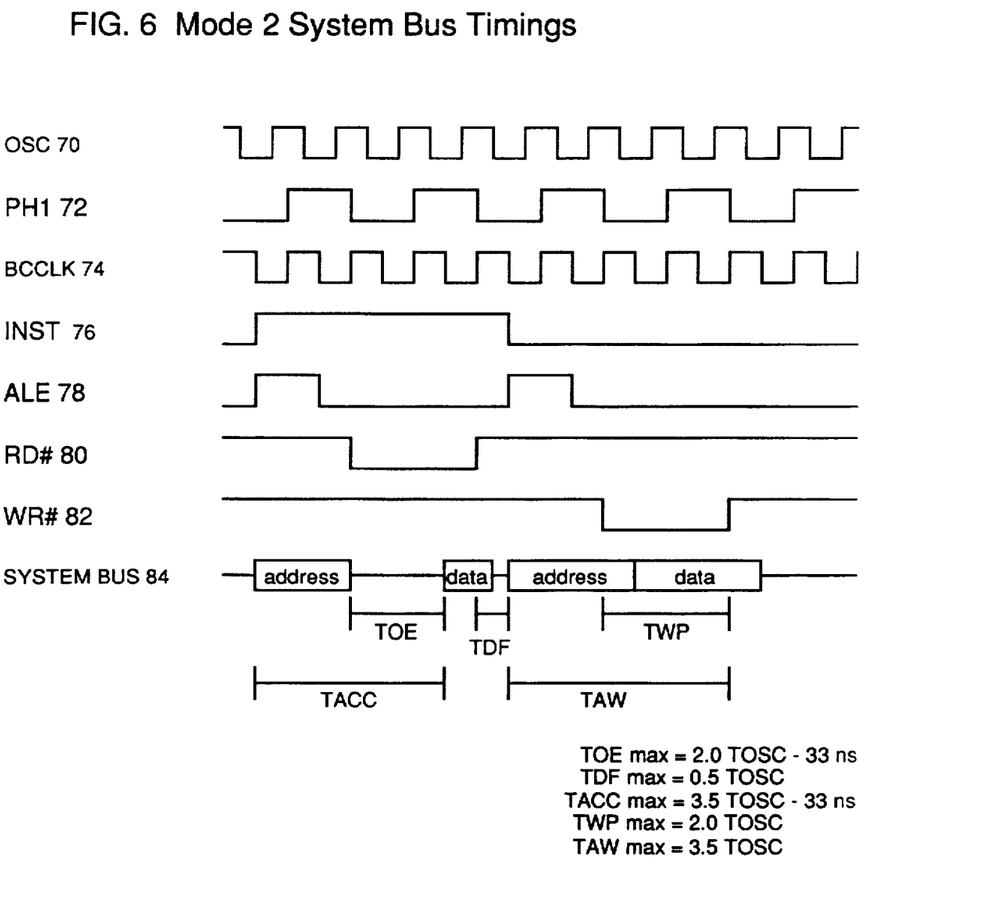
FIG. 6 is a timing diagram of waveforms that define the mode2 improved system bus timings of the currently preferred embodiment of the present invention.

Bus controller 38 of microcontroller 36 includes mode selector 42. Mode selector 42 selects one of three system bus timing modes depending on the logical values of signals msel1 46 and msel2 44. If msel1 46 and msel2 44 have logical values of 0 and 0, respectively, mode0 system bus timings as illustrated in FIG. 3 are selected. If msel1 46 and msel2 44 have logical values of 1 and 0, respectively, mode1 system bus timings as illustrated in FIG. 5 are selected. If msel1 46 and msel2 44 have logical values of 0 and 1, respectively, mode2 system bus timings as illustrated in FIG. 6 are selected.

Bus controller 38 of microcontroller 36 also includes signal shifter 40. Signal shifter 40 comprises combinational logic that receives ph1 52 and bcclk 48 as well as control signals from a state machine and generates either mode0, mode1, or mode2 timings of the system bus AD0-15 and its associated control signals ale, rd#, wr#, and inst depending on the logical values of the msel1 46 and msel2 44. In mode1 and mode2 timings, signal shifter 40 logically combines bcclk 48 with ph1 52 to shift the system bus timing events to correspond to edges of bcclk 48. Because bcclk 48 is an integer frequency multiple of ph1 52, bcclk 48 provides additional edges for triggering system bus events, thereby allowing greater flexibility in defining the system bus timings. In system bus timing mode1 and mode2, all timing events of the system bus and associated control signals are triggered by edges of bcclk 48 whether or not they are shifted with respect to mode0 timings. In mode0, all timing events of the system bus and associated control signals are triggered by edges of ph1 52. Mode0, mode1, and mode2 system bus timings are illustrated in FIG. 2, FIG. 5, and FIG. 6, respectively.

In the currently preferred embodiment of the present invention, msel1 46 and msel2 44 have a default value of, respectively, when microcontroller 36 comes out of reset.

Therefore, the microcontroller comes out of reset in mode0 system bus timings. During the initialization sequence following reset, the values of msel1 46 and msel2 44 are changed in accordance with the values of two bits fetched from a chip-configuration location in memory. If the microcontroller must access external memory during the initialization sequence before msel1 46 and msel2 44 are set, wait states are automatically inserted into the mode0 system bus timings to prevent incorrect data fetches from a slow memory. Also, mode selector 42 is prevented from changing the system bus timing mode during a current system bus access to prevent a corrupted access to external memory.

FIG. 5 illustrates the improved mode1 system bus timings for the microcontroller of the currently preferred embodiment of the present invention. Osc 54 is the system clock input to the microcontroller. Osc 54 is frequency divided-by-two to generate ph1 56. Note that ph1 56 is phase-delayed with respect to osc 54. Bcclk 58 is twice the frequency of and substantially in-phase with ph1 56. Inst 60 when asserted high indicates a code fetch during a read access. Ale 62 when asserted high indicates that a valid address is on system bus 68. Rd# 64 when asserted low indicates a read access from external memory. Wr# 66 when asserted low indicates a write access to external memory. System bus 68 is driven by both the microcontroller and the external memory at separate times. For a read access, the microcontroller first drives an address on system bus 68 followed by rd# 64 causing the external memory to drive data on system bus 68 for reading by the microcontroller. For a write access, the microcontroller first drives an address on system bus 68 and next drives data on system bus 68 for writing to the external memory which is controlled by wr# 66. All system bus events, including driving of data on system bus 68 and edges of the system bus control signals (inst 60, ale 62, rd# 64, and wr# 66), are triggered by edges of bcclk 58 in mode1 timings.

In many cases the TOE specification is the difficult one for a memory to meet. Mode 1 system bus timings improve the TOE specification of the system bus timings by advancing the falling of rd# 64 by 1.0 TOSC with respect to mode0 timings. The TOE specification becomes (2.0 TOSC–33 ns) for mode1 timings as compared to (1.0 TOSC–30 ns) for mode0 timings. The falling edge of wr# 66 is also advanced by 1.0 TOSC with respect to mode0 timings. This improves the TWP specification from 1.0 TOSC for mode0 timings to 2.0 TOSC for mode1 timings. The rising and falling edges of ale 62 are each advanced by 0.5 TOSC in mode1 timings with respect to mode0 timings to allow time between the falling edge of ale 62 and the falling edge of rd# 64 or wr# 66. During a write cycle, the microcontroller stops driving data on system bus 68 0.5 TOSC earlier in mode1 timings than in mode0 timings. The rising and falling edges of inst 60 are advanced by 0.5 TOSC with respect to mode0 timings such that inst 60 correctly indicates the timing of a read access from external code memory. All other timing events are the same in mode1 as in mode0. Therefore, mode1 doubles the TWP specification and improves the TOE specification for the microcontroller as compared to mode0 allowing compatibility with a much wider range of memories when the microcontroller is operating at its maximum frequency.

FIG. 6 illustrates the improved mode2 system bus timings for the microcontroller of the currently preferred embodiment of the present invention. Osc 70 is the system clock input to the microcontroller. Osc 70 is frequency divided-by-two to generate ph1 72. Note that ph1 72 is phase-delayed with respect to osc 70. Bcclk 74 is twice the frequency of and substantially in-phase with ph1 72. Inst 76 when asserted high indicates a code fetch during a read access. Ale 78 when asserted high indicates that a valid address is on system bus 84. Rd# 80 when asserted low indicates a read access from external memory. Wr# 82 when asserted low indicates a write access to external memory. System bus 84 is driven by both the microcontroller and the external memory at separate times. For a read access, the microcontroller first drives an address on system bus 84 followed by rd# 80 causing the external memory to drive data on system bus 84 for reading by the microcontroller. For a write access, the microcontroller first drives an address on system bus 84 and next drives data on system bus 84 for writing to the external memory which is controlled by wr# 82. All system bus events are triggered by edges of bcclk 74 in mode2 timings.

In some cases the TACC specification becomes the difficult one for an external memory to meet after TOE is improved. Mode2 system bus timings improve both the TOE and TACC specification of the system bus timings as compared to mode0 by advancing the falling of rd# 80 by 1.0 TOSC and driving the address on the system bus 0.5 TOSC earlier with respect to mode0 timings. However, this is done at the expense of tightening the specification for TDF. The TOE specification becomes (2.0 TOSC–33 ns) for mode2 timings as compared to (1.0 TOSC–30 ns) for mode0 timings. The TACC specification becomes (3.5 TOSC–33 ns) for mode2 timings as compared to (3.0 TOSC–30 ns) for mode0 timings. The TDF specification becomes 0.5 TOSC for mode2 timings as compared to 1.0 TOSC for mode0 timings. In mode2 timings, the falling edge of wr# 82 is advanced by 1.0 TOSC with respect to mode0 timings. This improves the TWP specification from 1.0 TOSC for mode0 timings to 2.0 TOSC for mode2 timings. The TAW specification becomes 3.5 TOSC for mode2 timings as compared to 3.0 TOSC for mode0 timings. The rising and falling edges of ale 78 are each advanced by 0.5 TOSC in mode2 timings with respect to mode0 timings to allow time between the falling edge of ale 78 and the falling edge of rd# 80 or wr# 82. During a write cycle, the microcontroller stops driving data on system bus 84 0.5 TOSC earlier in mode2 timings than in mode0 timings. The rising and falling edges of inst 76 are advanced by 0.5 TOSC with respect to mode0 timings such that inst 76 correctly indicates the timing of a read access from external code memory. All other timing events are the same in mode2 as in mode0. Therefore, mode2 doubles the TWP specification, and improves the TOE and TACC specifications as compared to mode0, thereby allowing compatibility with a much wider range of memories when the microcontroller is operating at its maximum speed.

Thus, an integrated circuit microcontroller chip with improved system bus timing modes that allow higher frequency operation for system bus access to external memory and also allows greater flexibility in choosing memory devices for a given operating frequency has been described.

What is claimed is:

1. An apparatus for exchanging data with a memory via a system bus, the apparatus comprising:

means for selecting either a first or second timing mode;

means for providing a primary and secondary clocks, the secondary clock being an integer frequency multiple of the primary clock such that at least one intermediate edge of the secondary clock occurs between edges of the primary clock; and bus controller means, coupled to the selecting means and the clock providing means, for generating a plurality of control signals for controlling the exchange of data with the memory, wherein the bus controller means generates the control signals in response to the primary clock when the first timing mode is selected and in response to the secondary clock when the second timing mode is selected, wherein the control signals have a first predetermined timing relationship when the first timing mode is selected and a second predetermined timing relationship when the second timing mode is selected, the first predetermined timing relationship being different than the second predetermined timing relationship, and wherein in the second timing mode at least one of the control signals is generated less than one-half period of the primary clock earlier than in the first timing mode and in response to at least one intermediate edge of the secondary clock.

2. The apparatus of claim 1 wherein when the second timing mode is selected the bus controller means generates more than one of the control signals in response to intermediate edges of the secondary clock.

3. The apparatus of claim 1 wherein edges of the primary clock occur at substantially the same time as corresponding edges of the secondary clock.

4. The apparatus of claim 3 wherein the clock providing means includes a phase-locked loop frequency multiplier for receiving the primary clock and generating the secondary clock.

5. The apparatus of claim 3 wherein the control signals include an address latch signal, a read signal for controlling the reading of data from the memory, and a write signal for controlling the writing of data to the memory.

6. The apparatus of claim 5 wherein the bus controller means also drives an address on the system bus, wherein the bus controller means drives the address in response to the primary clock when the first timing mode is selected and in response to the secondary clock when the second timing mode is selected, the timing for driving the address having a third predetermined timing relationship with the control signals when the first timing mode is selected and a fourth predetermined timing relationship with the control signals when the second timing mode is selected, the third predetermined timing relationship being different than the fourth predetermined timing relationship.

7. The apparatus of claim 6 wherein when the second timing mode is selected the bus controller means drives the address in response to intermediate edges of the secondary clock.

8. The apparatus of claim 7 wherein the clock providing means includes a phase-locked loop frequency multiplier for receiving the primary clock and generating the secondary clock.

9. An apparatus for exchanging data with a memory via a system bus, the apparatus comprising:

a selector for selecting either a first or second timing mode;

a clock generator for providing a primary and secondary clocks, the secondary clock being an integer frequency multiple of the primary clock such that at least one intermediate edge of the secondary clock occurs between edges of the primary clock; and a bus controller coupled to the selector and the clock generator, wherein the bus controller generates a plurality of control signals for controlling the exchange of data with the memory, wherein the bus controller generates the control signals in response to the primary clock when the first timing mode is selected and in response to the secondary clock when the second timing mode is selected, wherein the control signals have a first predetermined timing relationship when the first timing mode is selected and a second predetermined timing relationship when the second timing mode is selected, the first predetermined timing relationship being different than the second predetermined timing relationship, wherein in the second timing mode at least one of the control signals is generated less than one-half period of the primary clock earlier than in the first timing mode and in response to at least one intermediate edge of the secondary clock.

10. The apparatus of claim 9 wherein when the second timing mode is selected the bus controller generates more than one of the control signals in response to intermediate edges of the secondary clock.

11. The apparatus of claim 9 wherein edges of the primary clock occur at substantially the same time as corresponding edges of the secondary clock.

12. The apparatus of claim 11 wherein the clock generator includes a phase-locked loop frequency multiplier for receiving the primary clock and generating the secondary clock.

13. The apparatus of claim 11 wherein the control signals include an address latch signal, a read signal for controlling the reading of data from the memory, and a write signal for controlling the writing of data to the memory.

14. The apparatus of claim 13 wherein the bus controller also drives an address on the system bus, wherein the bus controller drives the address in response to the primary clock when the first timing mode is selected and in response to the secondary clock when the second timing mode is selected, the timing for driving the address having a third predetermined timing relationship with the control signals when the first timing mode is selected and a fourth predetermined timing relationship with the control signals when the second timing mode is selected, the third predetermined timing relationship being different than the fourth predetermined timing relationship.

15. The apparatus of claim 14 wherein when the second timing mode is selected the bus controller drives the address in response to intermediate edges of the secondary clock.

16. The apparatus of claim 15 wherein the clock generator includes a phase-locked loop frequency multiplier for receiving the primary clock and generating the secondary clock.

17. An apparatus comprising:

a system bus for providing a communication pathway;

memory means, coupled to the system bus, for storing data; and controller means, coupled to the system bus, for reading and writing data to the memory means, the controller means including:

means for selecting either a first or second timing mode;

means for providing a primary and secondary clocks, the secondary clock being an integer frequency multiple of the primary clock such that at least one intermediate edge of the secondary clock occurs between edges of the primary clock; and bus controller means, coupled to the selecting means and the clock providing means, for generating a plurality of control signals for controlling the exchange of data with the memory means, wherein the bus controller means generates the control signals in response to the primary clock when the first timing mode is selected and in response to the secondary clock when the second timing mode is selected, wherein the control signals have a first predetermined timing relationship when the first timing mode is selected and a second predetermined timing relationship when the second timing mode is selected, the first predetermined timing relationship being different than the second predetermined timing relationship, and wherein in the second timing mode at least one of the control signals is generated less than one-half period of the primary clock earlier than in the first timing mode and in response to at least one intermediate edge of the secondary clock.

18. The apparatus of claim 17 wherein when the second timing mode is selected the bus controller means generates more than one of the control signals in response to intermediate edges of the secondary clock.

19. The apparatus of claim 17 wherein edges of the primary clock occur at substantially the same time as corresponding edges of the secondary clock.

20. The apparatus of claim 19 wherein the clock providing means includes a phase-locked loop frequency multiplier for receiving the primary clock and generating the secondary clock.

21. The apparatus of claim 20 wherein the control signals include an address latch signal, a read signal for controlling the reading of data from the memory means, and a write signal for controlling the writing of data to the memory means.

22. An apparatus comprising:

a system bus for providing a communication pathway;

a memory, coupled to the system bus, for storing data; and a controller, coupled to the system bus, for reading and writing data to the memory, the controller including:

a selector for selecting either a first or second timing mode;

a clock generator for providing a primary and secondary clocks, the secondary clock being an integer frequency multiple of the primary clock such that at least one intermediate edge of the secondary clock occurs between edges of the primary clock; and a bus controller coupled to the selector and the clock generator, wherein the bus controller generates a plurality of control signals for controlling the exchange of data with the memory, wherein the bus controller generates the control signals in response to the primary clock When the first timing mode is selected and in response to the secondary clock when the second timing mode is selected, wherein the control signals have a first predetermined timing relationship when the first timing mode is selected and a second predetermined timing relationship when the second timing mode is selected, the first predetermined timing relationship being different than the second predetermined timing relationship, and wherein in the second timing mode at least one of the control signals is generated less than one-half period of the primary clock earlier than in the first timing mode and in response to at least one intermediate edge of the secondary clock.

23. The apparatus of claim 22 wherein when the second timing mode is selected the bus controller generates more than one of the control signals in response to intermediate edges of the secondary clock.

24. The apparatus of claim 22 wherein edges of the primary clock occur at substantially the same time as corresponding edges of the secondary clock.

25. The apparatus of claim 24 wherein the clock generator includes a phase-locked loop frequency multiplier for receiving the primary clock and generating the secondary clock.

26. The apparatus of claim 25 wherein the control signals include an address latch signal, a read signal for controlling the reading of data from the memory, and a write signal for controlling the writing of data to the memory.

27. A method for exchanging data with a memory via a system bus, the method comprising the steps of:

selecting either a first or second timing mode;

providing a primary and secondary clocks, the secondary clock being an integer frequency multiple of the primary clock such that at least one intermediate edge of the secondary clock occurs between edges of the primary clock; and generating a plurality of control signals for controlling the exchange of data with the memory, wherein the control signals are generated in response to the primary clock when the first timing mode is selected and in response to the secondary clock when the second timing mode is selected, the control signals having a first predetermined timing relationship when the first timing mode is selected and a second predetermined timing relationship when the second timing mode is selected, the first predetermined timing relationship being different than the second predetermined timing relationship, wherein in the second timing mode at least one of the control signals is generated less than one-half period of the primary clock earlier than in the first timing mode and in response to at least one intermediate edge of the secondary clock.

28. The method of claim 27 wherein when the second timing mode is selected more than one of the control signals is generated in response to intermediate edges of the secondary clock.

29. The method of claim 27 wherein edges of the primary clock occur at substantially the same time as corresponding edges of the secondary clock.

30. The method of claim 29 wherein the control signals include an address latch signal, a read signal for controlling the reading of data from the memory, and a write signal for controlling the writing of data to the memory.

31. The method of claim 29 further comprising the step of:

driving an address on the system bus, wherein the address is driven in response to the primary clock when the first timing mode is selected and in response to the secondary clock when the second timing mode is selected, the timing for driving the address having a third predetermined timing relationship with the control signals when the first timing mode is selected and a fourth predetermined timing relationship with the control signals when the second timing mode is selected, the third predetermined timing relationship being different than the fourth predetermined timing relationship.

32. The method of claim 31 wherein when the second timing mode is selected the address is driven in response to intermediate edges of the secondary clock.

* * * * *

UNITED STATES PATENT AND TRADEMARK OFFICE
CERTIFICATE OF CORRECTION

PATENT NO.   : 5,537,660
DATED        : July 16, 1996
INVENTOR(S)  : Bond et al.

It is certified that error appears in the above-identified patent and that said Letters Patent is hereby corrected as shown below:

In column 5, at lines 66-67, delete "default value of, respectively," and substitute --default value of 0 and 0, respectively,--.

In column 6, at line 13, delete "improved model system" and substitute --improved mode1 system--.

In column 6, at line 46, and twice in line 56, delete "model" and substitute --mode1--.

Signed and Sealed this

Twelfth Day of November, 1996

Attest:

BRUCE LEHMAN

Attesting Officer        Commissioner of Patents and Trademarks